(12) United States Patent
Fisher et al.

(10) Patent No.: US 10,669,008 B2
(45) Date of Patent: Jun. 2, 2020

(54) PROPELLER-MOTOR ASSEMBLY FOR EFFICIENT THERMAL DISSIPATION

(71) Applicant: VANTAGE ROBOTICS, LLC, San Francisco, CA (US)

(72) Inventors: Tobin Fisher, San Francisco, CA (US); Johannes Becker Van Niekerk, Livermore, CA (US)

(73) Assignee: VANTAGE ROBOTICS, LLC, San Francisco, CA (US)

( * ) Notice: Subject to any disclaimer, the term of this patent is extended or adjusted under 35 U.S.C. 154(b) by 636 days.

(21) Appl. No.: 15/085,860

(22) Filed: Mar. 30, 2016

(65) Prior Publication Data

US 2016/0288901 A1   Oct. 6, 2016

Related U.S. Application Data

(60) Provisional application No. 62/141,143, filed on Mar. 31, 2015.

(51) Int. Cl.
*B64C 11/02* (2006.01)
*B64C 39/02* (2006.01)
(Continued)

(52) U.S. Cl.
CPC .............. *B64C 11/02* (2013.01); *B64C 11/20* (2013.01); *B64C 39/024* (2013.01); *B64D 27/24* (2013.01); *B64D 33/08* (2013.01); *H02K 5/02* (2013.01); *H02K 7/14* (2013.01); *H02K 9/22* (2013.01); *B64C 2201/024* (2013.01);
(Continued)

(58) Field of Classification Search
CPC ....... B64C 11/02; B64C 11/20; B64C 29/024; H02K 5/02; H02K 7/14; H02K 9/22
See application file for complete search history.

(56) References Cited

U.S. PATENT DOCUMENTS 4,704,240 A * 11/1987 Reavely .................. B29C 35/02
264/102
4,780,052 A * 10/1988 Pradelle ................ F04D 29/545
415/119

(Continued)

OTHER PUBLICATIONS

Lilli Sherman, Plastics Technology, Plastics that Conduct Heat, Jun. 2001, Retrieved from (https://www.ptonline.com/articles/plastics-that-conduct-heat).*

*Primary Examiner* — Woody A Lee, Jr.
(74) *Attorney, Agent, or Firm* — Knobbe, Martens, Olson & Bear, LLP (57) ABSTRACT

A propeller drive assembly includes an electric motor having a stator and a rotor. During operation the motor generates heat. A propeller made from a thermally conductive plastic includes a hub that is secured to the rotor portion of the motor so that the heat generated within the motor is transferred by conductance through the thermally conductive hub and propeller and then, by convection, is absorbed by the surrounding air, as the propeller rotates through the air. A thermally conductive interface material can be positioned between the rotor portion of the motor and the hub of the propeller to increase the thermal efficiency of the heat transfer between the motor and the propeller. A thermally conductive grease can be used as the interface material and an O-ring seal can be provided about the rotor to prevent the grease from escaping during motor operation.

20 Claims, 9 Drawing Sheets

SECTION A-A (51) Int. Cl.
*B64D 33/08* (2006.01)
*B64D 27/24* (2006.01)
*B64C 11/20* (2006.01)
*H02K 9/22* (2006.01)
*H02K 7/14* (2006.01)
*H02K 5/02* (2006.01)

(52) U.S. Cl.
CPC .. *B64C 2201/042* (2013.01); *B64C 2201/108* (2013.01); *Y02T 50/62* (2013.01)

(56) References Cited

U.S. PATENT DOCUMENTS

| | | | |
|---|---|---|---|
| 6,485,339 B1 * | 11/2002 | Hartig | B63H 5/125 310/87 |
| 7,013,552 B2 * | 3/2006 | Du | H02K 9/06 264/272.19 |
| 7,814,641 B2 * | 10/2010 | Du | H01R 43/10 264/272.2 |
| 9,850,883 B1 * | 12/2017 | Maldonado | F03G 6/045 |
| 2003/0186601 A1 * | 10/2003 | Collier | B63H 1/16 440/66 |
| 2007/0237656 A1 * | 10/2007 | Pipkorn | F04D 29/526 417/366 |
| 2009/0263232 A1 * | 10/2009 | Jarrah | F04D 25/0613 415/4.4 |
| 2014/0197703 A1 * | 7/2014 | Chamberlin | H02K 9/22 310/64 |
| 2015/0129711 A1 * | 5/2015 | Caubel | B64C 27/08 244/17.23 |
| 2016/0194069 A1 * | 7/2016 | Taylor | B64C 39/024 244/17.23 |
| 2017/0166303 A1 * | 6/2017 | Hartmann | B64C 27/32 |
| 2017/0196097 A1 * | 7/2017 | Barwicz | H05K 5/0004 |
| 2017/0225796 A1 * | 8/2017 | Sun | B64D 33/08 |
| 2017/0254334 A1 * | 9/2017 | Kadijk | F04D 29/582 |

* cited by examiner

PROPELLER-MOTOR ASSEMBLY FOR EFFICIENT THERMAL DISSIPATION

CROSS-REFERENCE TO RELATED APPLICATIONS

This application claims the benefit of U.S. Provisional Application No. 62/141,143, filed Mar. 31, 2015, entitled "Propeller-Motor Assembly for Efficient Thermal Dissipation," which is hereby incorporated by reference in its entirety.

BACKGROUND

Technical Field

Embodiments disclosed herein generally relate to propeller driven unmanned aerial vehicles of the type that are powered by electric motors. Specifically, certain embodiments disclosed herein relate to methods and structures which can be used to manage heat dissipation from the electric motors in such vehicles.

Description of the Related Art

The performance and operation of most electronic and electrical systems and devices are adversely affected by heat. Unfortunately, most electronic and electrical systems and devices generate heat as they operate. The generated heat must be managed to prevent a reduction in performance or overall operational failure of such electronic and electrical systems and devices. The electric motor is one such device.

When designing a device that is powered by an electric motor, important considerations include output speed and output torque. As described below, the performance characteristics of two main components of an electric motor change with an increase in temperature, the resistance of the motor's windings and the flux density of the motors permanent magnets. These changes will affect the performance of the motor and, in turn, the performance of the device that the motor powers.

Winding resistance and permanent magnet flux density will change as temperature changes. As the temperature within a motor housing increases, winding resistance will increase based on the temperature coefficient of copper (which is typically used in motor windings). The flux density of the permanent magnets will also decrease as a function of temperature. Changes in these two key components of the motor will result in an increase in motor no-load speed and a decrease in motor locked rotor torque, altering the overall slope of the motor curve.

The motor torque constant and voltage constant are directly related to the magnetic flux density of the permanent magnets. Depending on the physics of the magnet material used, overall flux density will change at a given percentage with an increase in magnet temperature. As the material temperature increases, atomic vibrations cause once-aligned magnetic moments to "randomize" resulting in a decrease in magnetic flux density. Assuming the motor is operating within its intended design window, the decrease in flux density is temporary and will begin to recover as the magnet cools. If the maximum temperature rating of the magnets is exceeded, however, partial demagnetization will occur and permanently alter the performance of the motor.

Motor winding resistance is the main cause of heat generation within the motor. In order for any electric motor to generate torque, current needs to be forced through the motor windings. Copper is an excellent conductor, however, it is not perfect. Material physics and impurities will cause the atoms within the copper to vibrate at a faster rate as more current flows. The result is a steady temperature increase in the motor windings as the motor operates.

Another potential cooling-related failure mode is that motors are commonly designed to include small air gaps between motor components, such as between the stator and the rotor, for maximum motor efficiency. Modern electric motors used in AUVs often have air gaps that are similar in size to a grain of sand, making them vulnerable to having sand or other small particles caught in the air gap, causing the motor to seize.

Management of heat generated within an electric motor can ensure that the motor remains "cool" and therefore maintains operating efficiency and provides acceptable power output.

SUMMARY

Some innovations relate to a propeller drive assembly including an electric motor having a stator and a rotor; and a propeller having a hub and one or more opposing blades projecting from said hub, said hub being mechanically secured to said rotor and comprising a thermally conductive plastic so that heat generated in said motor is transferred to said surrounding air through said hub.

The hub and said blades can be formed integrally. The propeller can include a plastic that has a coefficient of thermal conductivity greater than 1 W/m-K. The propeller drive assembly can further include a thermally conductive interface material positioned between said rotor and said hub, the thermally conductive interface material having a coefficient of thermal conductivity greater than or equal to a coefficient of thermal conductivity of said hub.

The propeller drive assembly can further include a gap-filling thermally conductive interface material positioned between said rotor and said hub. The thermally conductive interface material can include a thermally conductive grease. The propeller can include inwardly-extending radial vanes which increase the rate of convective heat transfer from the motor to the propeller.

Some innovations relate to a propeller drive assembly including an electric motor having a stator and a rotor; and a propeller having a hub and one or more opposing blades projecting from said hub, said hub mechanically secured to said rotor, said propeller comprising a thermally conductive plastic so that heat generated in said motor is transferred to said surrounding air through said propeller.

The propeller can include a plastic that has a coefficient of thermal conductivity greater than 1 W/m-K. The propeller drive assembly can further include a thermal interface material in contact with the rotor and the hub. The thermal interface material can include a single layer of a deformable material.

Some innovations relate to a propeller assembly, comprising an electric motor comprising a rotor and a stator; and a propeller, the propeller comprising a hub mechanically secured to the rotor, wherein at least a portion of the hub includes a non-metallic, thermally conductive material; and at least one propeller blade.

The non-metallic thermally conductive material can include a polymeric material. The at least one propeller blade can include the non-metallic, thermally conductive material. The at least one propeller blade can be configured to rotate through a swept area, and the diameter of the swept area of the propeller can be less than 24 inches. The diameter of the swept area of the propeller can be less than 12 inches.

The propeller assembly can additionally include a thermal interface material in contact with and providing a thermal conduit between the hub and the rotor. The thermal interface material can include a thermally conductive grease. The thermal interface material can include a deformable layer of a thermally conductive material. The propeller hub can include internal vanes which increase the rate of convective heat transfer from the motor to the propeller hub.

Like reference numbers and designations in the various drawings indicate like elements. Note that the relative dimensions of the figures may not be drawn to scale.

DETAILED DESCRIPTION

Embodiments described herein relate to the management of thermal energy generated in electric motors during their operation. In certain embodiments, the thermal management can be used in conjunction with motors powering propellers, such as those used in quadcopters and other UAVs.

Figure 1:
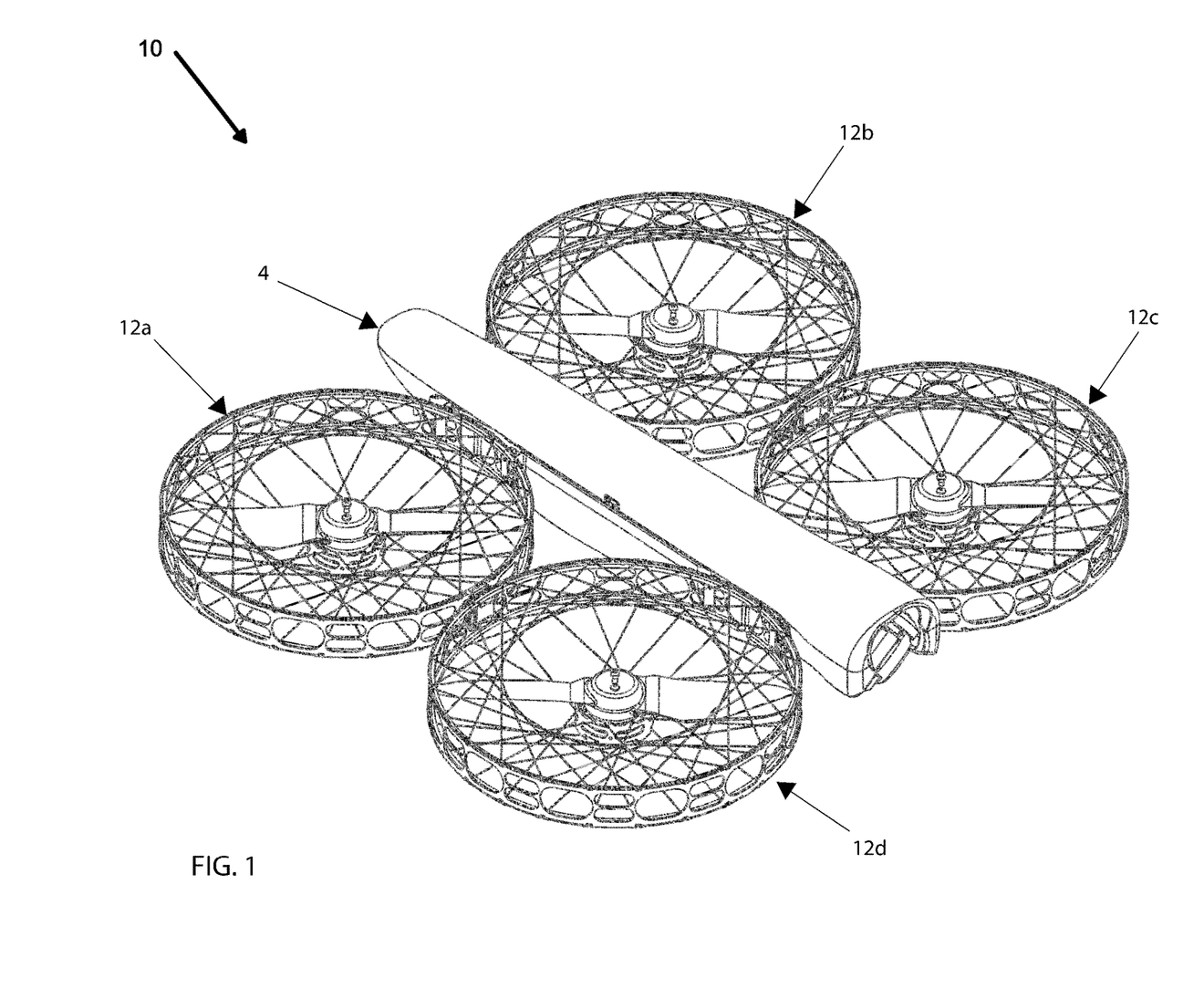
FIG. 1 is a perspective view of an exemplary unmanned aerial vehicle including four electric motors, each mechanically connected to a propeller.

FIG. 1 is a perspective view of an exemplary unmanned aerial vehicle. The exemplary unmanned aerial vehicle (hereafter "UAV") is, in the illustrated embodiment, a quadcopter 10. UAV quadcopter 10 includes four thrust pods 12a-d secured relative to a body 4, with each thrust pod including a propeller drive assembly including a motor and a propeller. In other embodiments, however, UAVs having additional or fewer propellers can be used. Additional details of UAVs such as quadcopter 10 are described in U.S. application Ser. No. 14/990,057, filed Jan. 7, 2016 and entitled "UNMANNED AERIAL VEHICLE WITH PROPELLER PROTECTION AND HIGH IMPACT-SURVIVABILITY," the disclosure of which is hereby incorporated by reference in its entirety.

While the embodiments described herein can be used with UAVs of a wide variety of sizes, some embodiments may be used with UAVs having propellers with swept area diameters of less than 24 inches, less than 12 inches, or less than 8 inches. However, the embodiments described herein are not limited to use with UAVs having propellers with swept area diameters of a specific size, and may be used in conjunction with UAVs having propellers with swept areas larger than 24 inches in diameter, as well. Furthermore, embodiments described herein can be used in devices other than UAVs.

Figure 2:
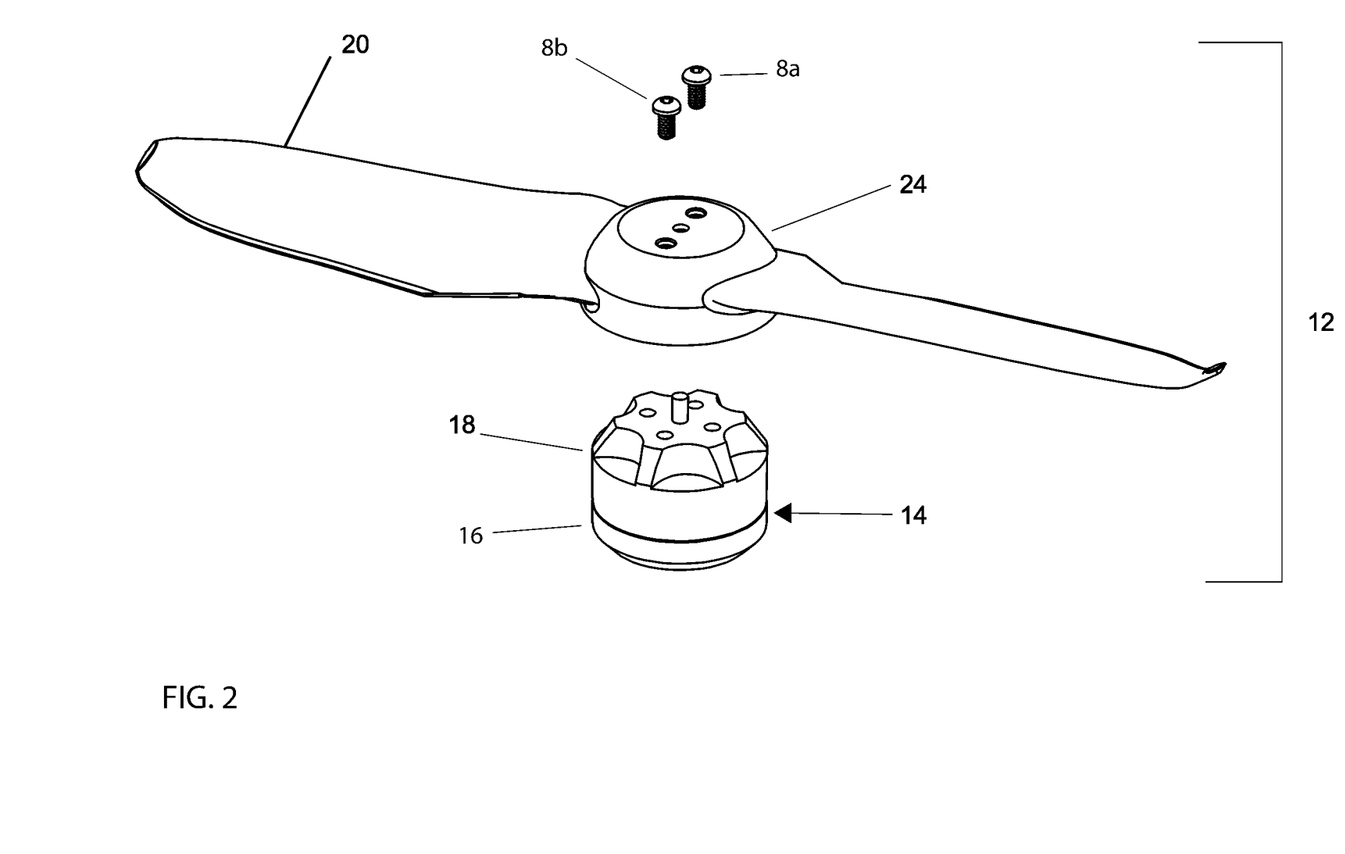
FIG. 2 is an exploded view of a propeller drive assembly such as one of the four motor and propeller pairs of the unmanned aerial vehicle of FIG. 1.

FIG. 2 is an exploded view of a propeller drive assembly such as one of the four motor and propeller pairs of the unmanned aerial vehicle of FIG. 1. In the embodiment illustrated in FIG. 1, each propeller drive assembly 12 includes a motor assembly 14, including a DC brushless motor 16 having a rotor housing 18 onto which a propeller 20 is mechanically secured, using two threaded fasteners 8a,b. When motor 16 is electrically powered, rotor housing 18 and secured propeller 20 rotates. Propeller 20 includes a hub portion 24 that is sized and shaped to snugly fit over rotor housing 18. In some embodiments, an RC1 close-sliding fit or similar fit can be used to provide accurate location of components, and assembly of these components without noticeable play. Other suitable fit or assembly methods can also be used.

In some embodiments, each motor assembly 14 is substantially sealed against dust and dirt. In some embodiments, propeller 20 includes a thermally conductive material, which may have a thermal conductivity greater than 1 W/m-K (W/m-k=Watts per meter Kelvin). In some embodiments, propeller 20 includes a thermally conductive material which has a thermal conductivity greater than 10 W/m-K. In some embodiments, propeller 20 is made from a thermally conductive plastic, such as the thermally conductive plastic called CoolPoly® E-series E3607, manufactured by Celanese Corporation of Irving, Texas. This E-series E3607 plastic has a coefficient of thermal conductivity of 20 W/m-K.

In some embodiments, thermally conductive plastic can be used for all or part of the propeller 20 instead of lightweight metals such as aluminum. The use of thermally conductive plastic rather than lightweight metals can provide advantages in terms of cost, thermal expansion and weight. Propellers made from aluminum would provide a much better coefficient of thermal conductivity, but would have a correspondingly high coefficient of thermal expansion (CTE), would be very expensive to mass produce, and would weigh substantially more than plastic.

In contrast to aluminum, thermally conductive plastics boast lower coefficients of thermal expansion (CTE), weigh about 40% less than aluminum and can be made quickly, accurately, and relatively inexpensively using standard injection molded techniques.

In other embodiments, however, other materials can be used in addition to or in place of a thermally conductive plastic material. In some embodiments, the propeller hub 24 or propeller 20 may include a composite material, graphite, graphene, or any suitable material. In some embodiments, reinforcing material can be used in conjunction with thermally conductive material, such as by coating another material with a thermally conductive plastic, or by including structural fibers or other support within a propeller formed from a thermally conductive plastic.

Owing to the RC1 fit between hub portion 24 of propeller 20 and rotor housing 18, a substantial portion of the inside surface area of hub portion 24 of propeller 20 is in physical contact with a substantial portion of the outside surface area of rotor housing 18 of motor assembly 14. This intimate surface contact decreases the thermal resistance between each electric motor 16 and each connected propeller 20. The end result, in such an embodiment, is that during operation of each motor 16, each propeller 20 rotates through cooler air and becomes a very effective heat-sink, drawing heat from motor 16, though hub portion 24, through the structure of propeller 20 and into the cooler air. This provides a thermal conduction path between the heat-generating components of the motor assembly 14 and the propeller 20, which in turn provides convective heat transfer away from the propeller 20 during operation of the motor assembly 14.

Therefore propeller drive assembly 12 functions to decrease motor operating temperature which helps keep motor 16 operating efficiently, providing maximum designed torque and power.

Figure 3:
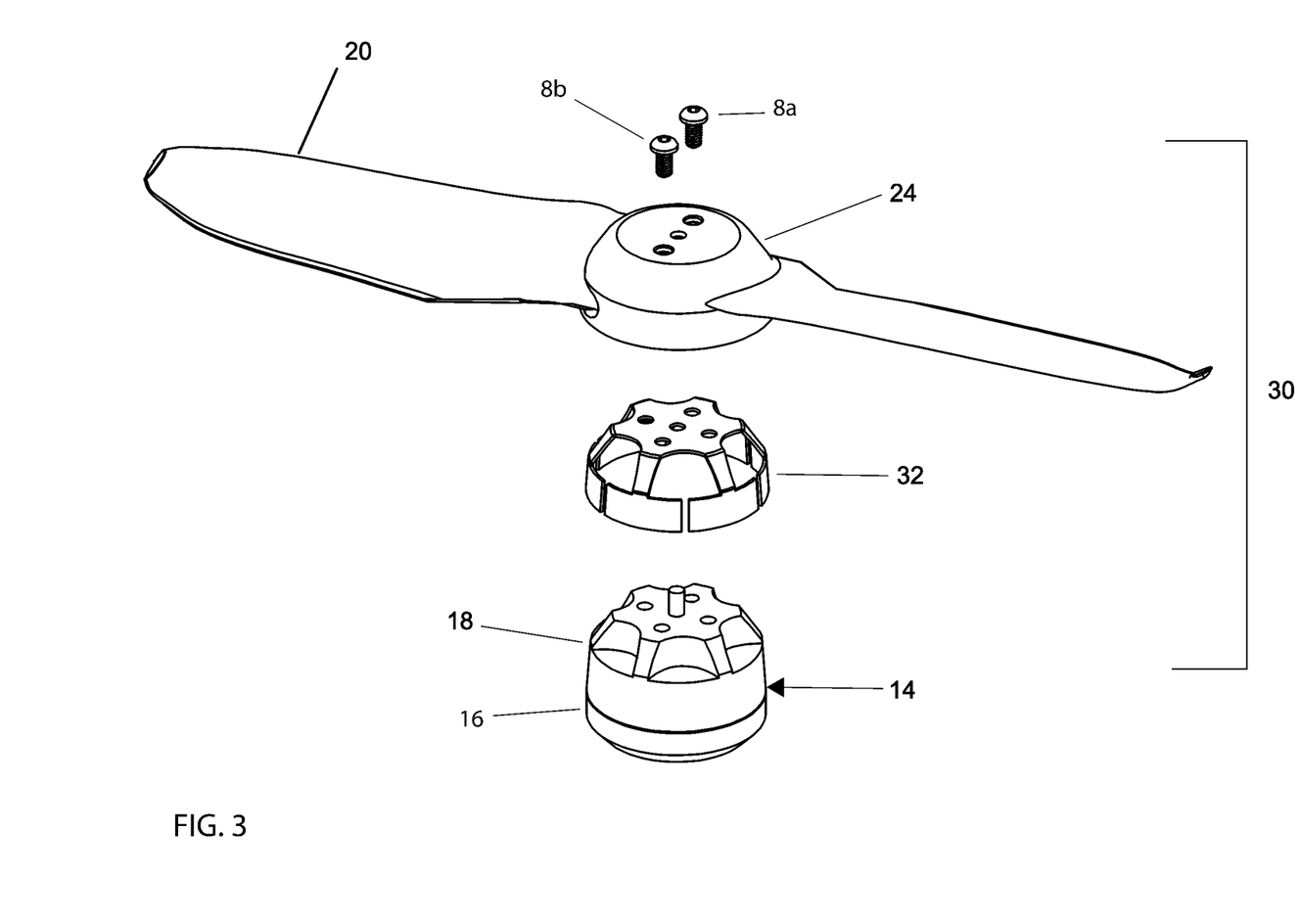
FIG. 3 is an exploded view of a propeller drive assembly such as one of the four motor and propeller pairs of the unmanned aerial vehicle of FIG. 1, including a thermal interface material.

Referring now to FIG. 3, an exploded assembly view of a propeller drive assembly 30 is shown, wherein a thermally conductive interface material 32 is positioned between rotor housing 18 and hub portion 24 of propeller 20. The thermally conductive interface material can in some embodiments include a flexible, soft, or deformable material to further increase the surface area in contact with the rotor housing 18 and the propeller 20, and enhance the thermal coupling between the rotor housing 18 and the propeller 20.

In some embodiments thermally conductive interface material 32 can include a commercially available material such as part number 5567H, Thermally Conductive Acrylic Thermal Interface Pad, manufactured by 3M of Maplewood, Minn. 5567H is 0.5 mm thick, has a thermal conductivity rating of 3 W/mK, and has a hardness rating of approximately SHORE A 14. The low durometer (softness) of this or similar materials for the thermally conductive interface material 32 can provide spatial gap filling between a positioned surfaces of motor 16 material and propeller 20 over a larger surface area. In some embodiments, the thermally conductive interface material can be a die cut portion of a suitable material, and may include apertures extending therethrough to allow passage of threaded fasteners 8a and 8b.

During operation the motor generates heat. The hub 24 of the propeller 20 comprises a thermally conductive plastic or other material and is secured to a portion of the rotor of the motor such as rotor housing 18 so that the heat generated within the motor is transferred by conductance through the thermally conductive hub and then, by convection, is transferred to the surrounding air. A controlled amount of heat energy generated within motor 16 is drawn from the motor 16, through thermal conductive interface material 32, through propeller 20, and absorbed by the cooler surrounding air. During operation of the propeller drive assembly 30, the motor 16 will rotate propeller 20, and the convective transfer of heat into the surrounding air as the propeller rotates through the air will be much more efficient than a stationary heat sink.

Figure 4:
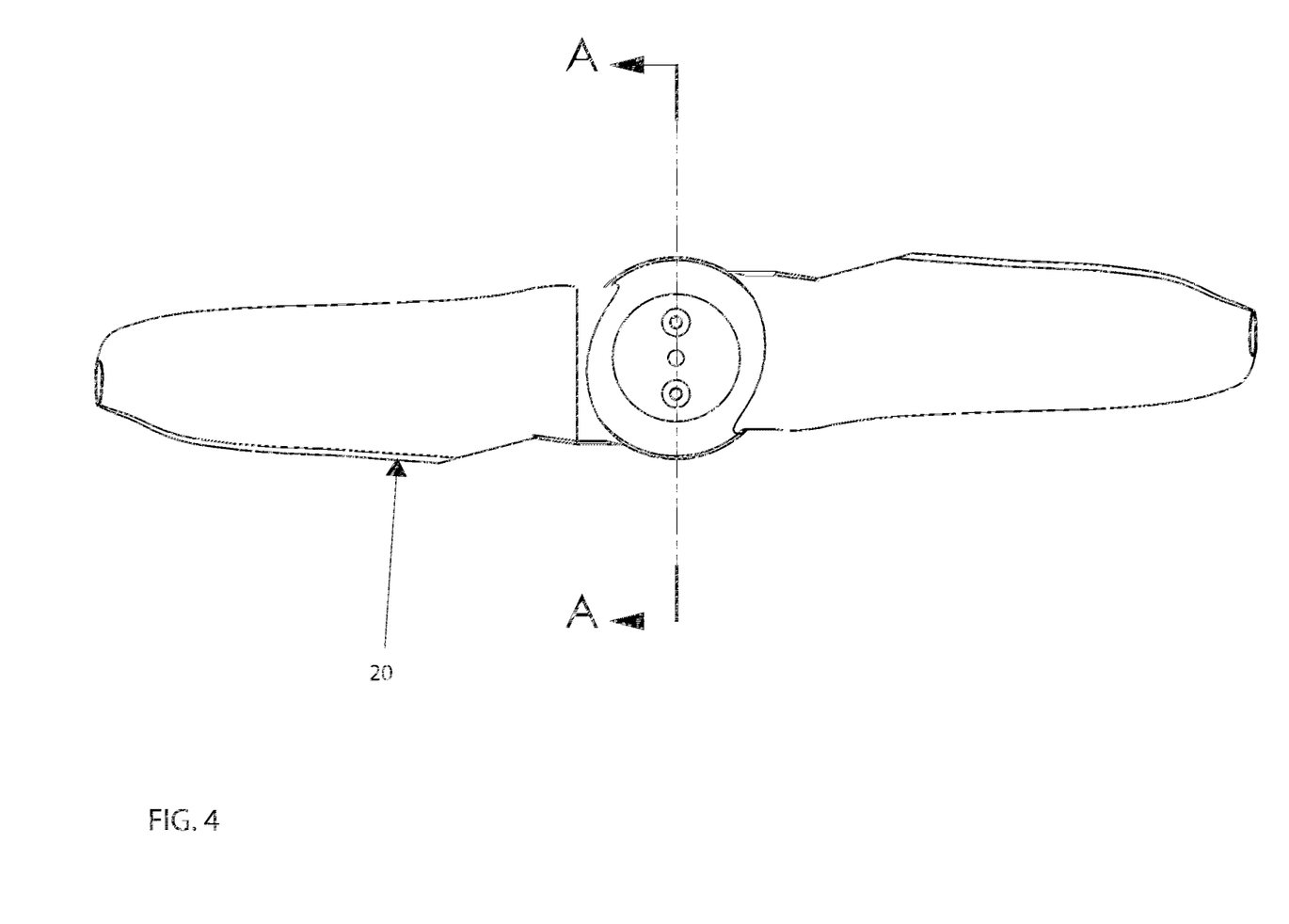
FIG. 4 is a plan view of a propeller drive assembly such as the propeller drive assembly of FIG. 3.
Figure 5:
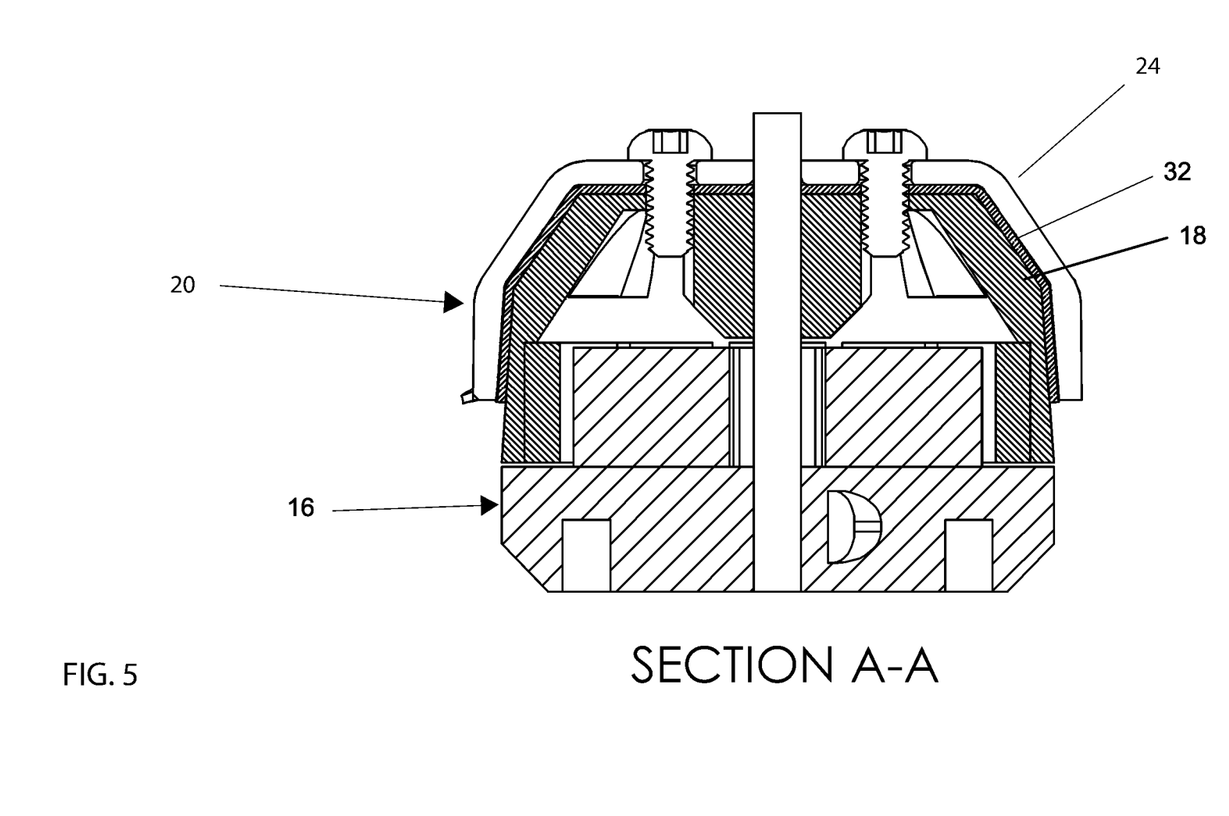
FIG. 5 is a sectional view of the propeller drive assembly of FIG. 4, taken along the lines A-A of FIG. 4, showing details of the propeller, the electric motor, and a thermal interface material.

FIG. 4 is a plan view of a propeller drive assembly such as the propeller drive assembly of FIG. 3. FIG. 5 is a sectional view of the propeller drive assembly of FIG. 4, taken along the lines A-A of FIG. 4 In FIG. 5, details of motor 16, rotor housing 18, hub portion 24 of propeller 20 and thermally conductive interface material 32 are shown. Thermally conductive interface material 32 is shaped to snugly fit between hub portion 24 of propeller 20 and the outside surface of rotor housing 18. In this arrangement, thermally conductive interface material 32 increases the efficiency that heat may be drawn away from operating motor 16 and into propeller 20. Through conduction, heat now flows from motor 16, through thermally conductive interface material 32 and into propeller 20. As before, as propeller 20 rotates, the heat from thermally conductive interface material 32 and motor 16 quickly dissipates to the surrounding air.

Figure 6:
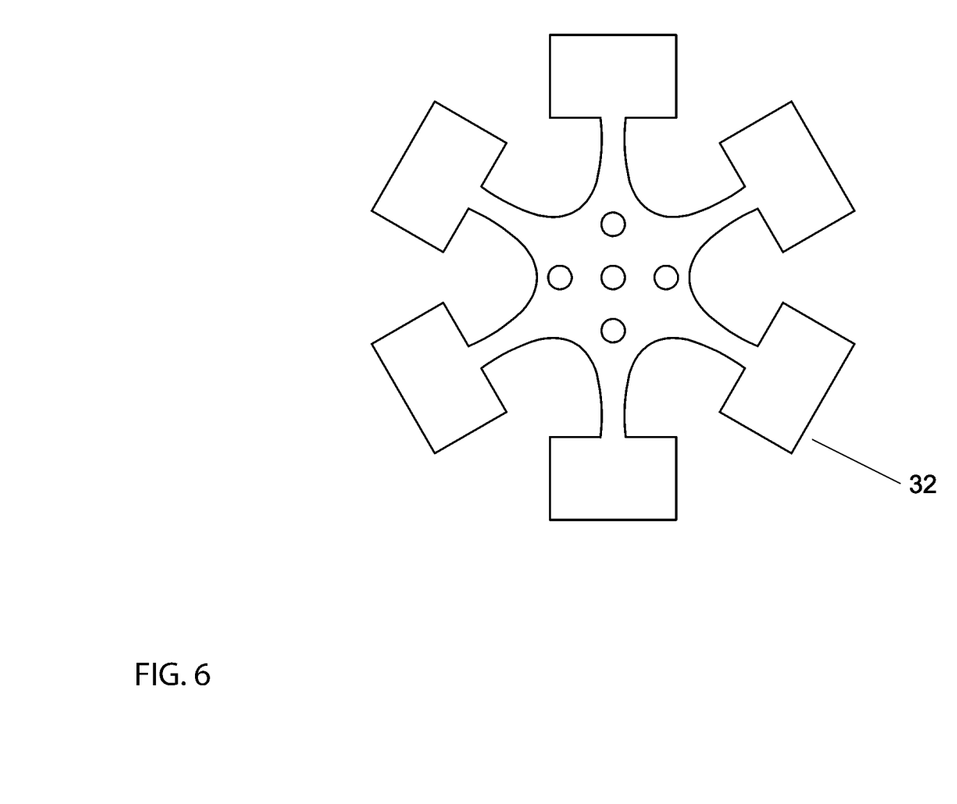
FIG. 6 is a plan top view of the thermal interface material of FIG. 5, shown in a flat, pre-formed configuration.

Referring to FIG. 6, a plan view of a pre-formed shape of thermally conductive interface material 32 is shown. As discussed above, the thermally conductive interface material 32 is sized and dimensioned to fit between the facing surfaces of the inside surface area of hub portion 24 of propeller 20 and the facing surfaces of the outside surface area of rotor housing 18 of motor assembly 14 which would otherwise be in contact with or closely adjacent one another.

For a generally convex surface such as the outer surface of rotor housing 18, a planar shape can be formed which will, when bent over the convex surface, cover the outer surfaces of the generally convex surfaces to form an efficient thermal coupling to draw heat away from those outer surfaces. In other embodiments, however, a thermal interface may be formed in multiple sections, and need not be a unitary structure.

In the illustrated embodiment, the threaded fasteners which secure the propeller hub to the rotor housing may pass through apertures in the thermally conductive interface material 32, and may also serve to position or secure the thermally conductive interface material 32 relative to the other components of the propeller drive assembly. In other embodiments, however, a thermally conductive material may be secured only or primarily via clamping forces between the rotor housing and the propeller hub 24, or may be secured via an adhesive or applied as a coating to one or both of the facing surfaces of the rotor housing and the propeller hub 24.

Figure 7:
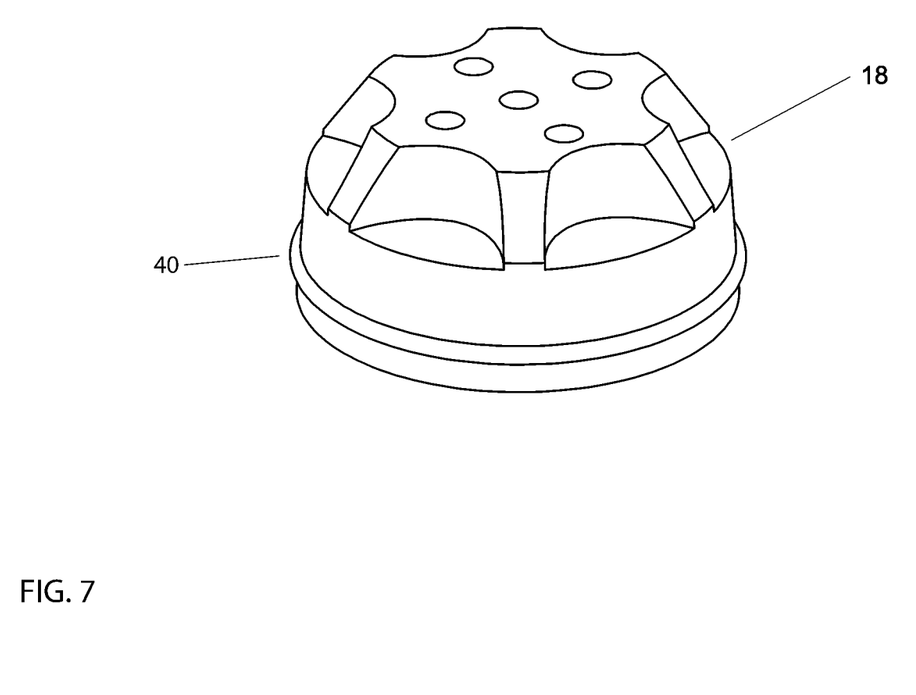
FIG. 7 is a perspective view of a rotor portion of another embodiment of a motor assembly which includes a captive O-ring.

FIG. 7 is a perspective view of a rotor portion of another embodiment of a motor assembly which includes a captive O-ring. FIG. 7 shows a modified rotor housing 38 with an O-ring 40 disposed within an O-ring channel. The O-ring 40 may be used to seal thermal grease in the space located between rotor housing 18 and propeller hub 24 of propeller 20, and prevent the grease from escaping during motor operation. The thermal grease can be used in place of or in addition to a thermal interface material such as the thermal interface material 32 of FIG. 5.

Figure 8:
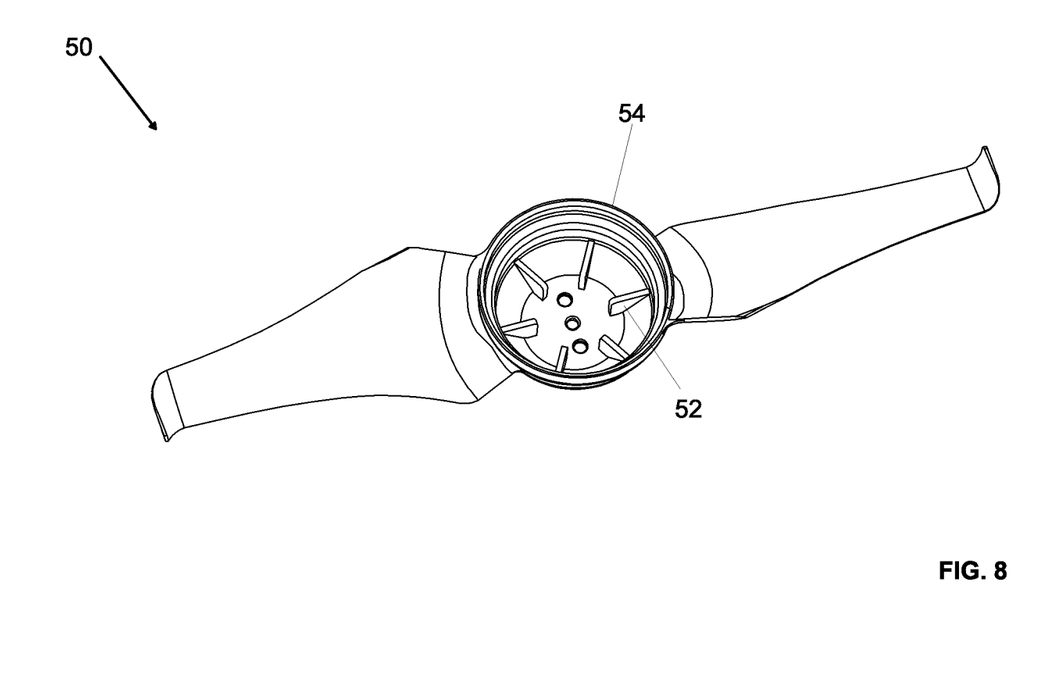
FIG. 8 is a perspective view of an embodiment of a propeller including convective heat transfer enhancing features in the form of inwardly extending radial vanes.

FIG. 8 is a perspective view of an embodiment of a propeller including convective heat transfer enhancing features in the form of inwardly extending radial vanes. The propeller 50 includes a propeller hub 54 having a plurality of radially-aligned vanes 52 extending inward into the interior of the propeller hub 54. The radial vanes 52, which will rotate along with the propeller 50, can increase convective heat transfer between the air in the interior of the hub 54 and the hub 54, by increasing the amount of surface area in contact with the air in the interior of the hub 54. The rotation of the radial vanes 52 through the air will also agitate the air in the interior of the hub 54 resulting in increased convective heat transfer.

Figure 9:
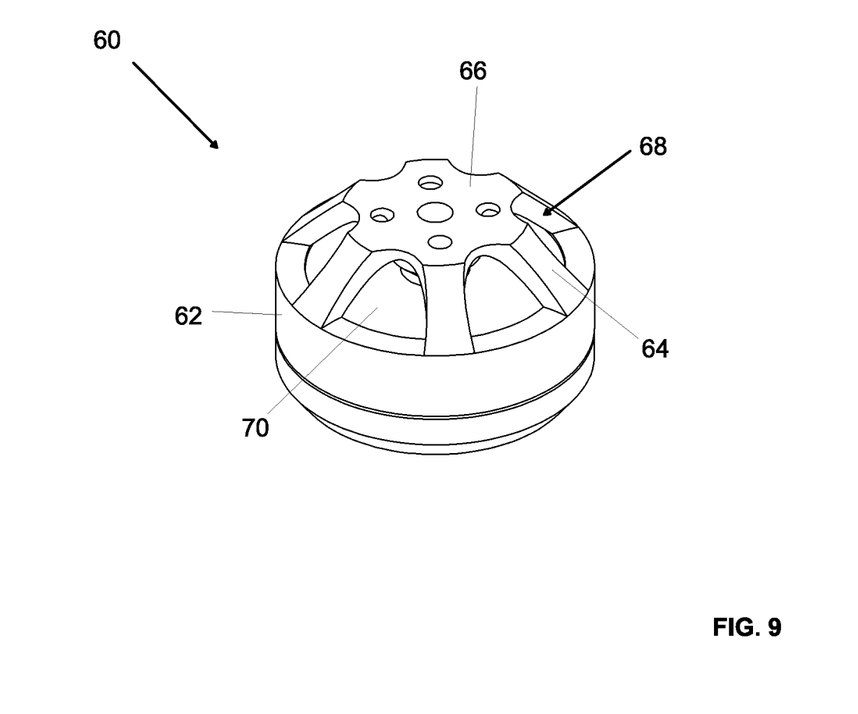
FIG. 9 is a perspective view of a motor which can be used in conjunction with the propeller of FIG. 8.

FIG. 9 is a perspective view of a motor which can be used in conjunction with the propeller of FIG. 8. The motor 60 includes a rotor housing 68 having a plurality of surfaces which can be brought into contact with the interior surface of the hub 54 of FIG. 8, with or without a thermal interface material such as thermal interface material 32 of FIG. 5 being disposed between the hub 54 and the motor 60. These potential contact surfaces include the substantially vertical (as illustrated) contact surface 62, the angled contact surfaces 64, and the upper horizontal (as illustrated) contact surface 66. The areas 70 between these contact surfaces of the rotor housing 68 are open to the interior of the motor, including the stator windings where a substantial amount of heat may be generated during operation of the motor.

The radial vanes 52 may be spaced and dimensioned to fit into some or all of the areas 70 between the contact surfaces of the rotor housing 68. During rotation of the rotor housing 68, the radial vanes 52 will agitate the air within the motor 60, resulting in convective heat transfer between the heat-generating motor components, such as the stator, and the hub 54 of propeller 50. The radial vanes provide an improved convective heat transfer path between the motor and the hub 54, in addition to the conductive heat transfer path between the contact surfaces of the rotor housing 68 and the facing interior surfaces of the hub 54. Because the radial vanes 52 are internal, they will not have a significant impact on the aerodynamic properties of the propeller 50 itself.

In some embodiments, the radial vanes may be formed from the same material as some or all of the other portions of the propeller 50, and in some embodiments the radial vanes may be integrally formed along with the propeller hub 54 and the blades of propeller 50. However, in other embodiments the radial vanes may include a different material, such as a material which is more thermally-conductive than some or all of the other components of the propeller 50.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A propeller drive assembly including:
a substantially sealed electric motor having a stator and a rotor; and
a propeller having a hub and one or more opposing blades projecting from said hub, said hub being mechanically secured to said rotor and comprising a thermally conductive plastic so that heat generated in said substantially sealed motor is transferred to said surrounding air through said hub, said hub being dimensioned to fit over the rotor to prevent dust or dirt from entering the motor.

2. The propeller drive assembly of claim 1, wherein said hub and said blades are formed integrally.

3. The propeller drive assembly of claim 2, wherein said propeller comprises a plastic that has a coefficient of thermal conductivity greater than 1 W/m-K.

4. The propeller drive assembly of claim 2, further comprising a thermally conductive interface material positioned between said rotor and said hub, said thermally conductive interface material having a coefficient of thermal conductivity greater than or equal to a coefficient of thermal conductivity of said hub.

5. The propeller drive assembly of claim 1, further comprising a gap-filling thermally conductive interface material positioned between said rotor and said hub.

6. The propeller drive assembly of claim 5, wherein said thermally conductive interface material comprises a thermally conductive grease.

7. The propeller drive assembly of claim 1, wherein the propeller comprises inwardly-extending radial vanes which increase the rate of convective heat transfer from the motor to the propeller.

8. A propeller drive assembly including:
a substantially sealed electric motor having a stator and a rotor;
a propeller having a hub and one or more opposing blades projecting from said hub, said hub mechanically secured to said rotor, said propeller comprising a thermally conductive plastic so that heat generated in said substantially sealed motor is transferred to said surrounding air through said propeller; and
a thermal interface material in contact with the rotor and the hub.

9. The propeller drive assembly of claim 8, wherein the propeller comprises a plastic that has a coefficient of thermal conductivity greater than 1 W/m-K.

10. The propeller drive assembly of claim 8, wherein the thermal interface material comprises a thermally conductive grease.

11. The propeller drive assembly of claim 8, wherein the thermal interface material comprises a single layer of a deformable material.

12. The propeller assembly of claim 8, wherein the hub is dimensioned to fit over the rotor to prevent dust or dirt from entering the motor.

13. A propeller assembly, comprising:
an electric motor comprising a rotor and a stator, the electric motor being substantially sealed to prevent dust or dirt from entering the motor;
a propeller, the propeller comprising:
a hub mechanically secured to the rotor, wherein at least a portion of the hub includes a non-metallic, thermally conductive material; and
at least one propeller blade; and
a thermal interface material in contact with and providing a thermal conduit between the hub and the rotor.

14. The propeller assembly of claim 13, wherein the non-metallic thermally conductive material comprises a polymeric material.

15. The propeller assembly of claim 13, wherein the at least one propeller blade is configured to rotate through a swept area, and the diameter of the swept area of the propeller is less than 24 inches.

16. The propeller assembly of claim 15, wherein the diameter of the swept area of the propeller is less than 12 inches.

17. The propeller assembly of claim 13, wherein the at least one propeller blade comprises the non-metallic, thermally conductive material.

18. The propeller assembly of claim 13, wherein the thermal interface material comprises a thermally conductive grease.

19. The propeller assembly of claim 13, wherein the thermal interface material comprises a deformable layer of a thermally conductive material.

20. The propeller assembly of claim 13, wherein the hub is dimensioned to fit over the rotor to prevent dust or dirt from entering the motor.

* * * * *